US012379135B1

(12) United States Patent
Ho et al.

(10) Patent No.: US 12,379,135 B1
(45) Date of Patent: Aug. 5, 2025

(54) SYSTEMS AND METHODS FOR HIGH TEMPERATURE BULK SOLID STORAGE AND HANDLING

(71) Applicants: National Technology & Engineering Solutions of Sandia, LLC, Albuquerque, NM (US); Matrix PDM Engineering, Columbus, OH (US); Allied Mineral Products, Inc., Columbus, OH (US)

(72) Inventors: Clifford K. Ho, Albuquerque, NM (US); Kevin Albrecht, Albuquerque, NM (US); Jeremy Niko I. Sment, Albuquerque, NM (US); Joshua M. Christian, Albuquerque, NM (US); Timothy A. Harvey, Columbus, OH (US); Matthew Lambert, Columbus, OH (US)

(73) Assignees: National Technology & Engineering Solutions of Sandia, LLC, Albuquerque, NM (US); Timothy A Harvey, Columbus, OH (US); Allied Mineral Products, Inc., Columbus, OH (US)

( * ) Notice: Subject to any disclaimer, the term of this patent is extended or adjusted under 35 U.S.C. 154(b) by 552 days.

(21) Appl. No.: 16/876,450

(22) Filed: May 18, 2020

Related U.S. Application Data

(60) Provisional application No. 62/849,065, filed on May 16, 2019.

(51) Int. Cl.
| | | |
|---|---|---|
| *F24S 20/20* | (2018.01) | |
| *F24S 60/10* | (2018.01) | |
| *F24S 80/20* | (2018.01) | |
| *F24S 80/30* | (2018.01) | |
| *F24S 80/65* | (2018.01) | |
| *F24S 80/00* | (2018.01) | |

(52) U.S. Cl.
CPC ............... *F24S 20/20* (2018.05); *F24S 60/10* (2018.05); *F24S 80/20* (2018.05); *F24S 80/30* (2018.05); *F24S 80/65* (2018.05); *F24S 2080/012* (2018.05)

(58) Field of Classification Search
CPC .......................... B65G 65/365; B01F 25/8211
See application file for complete search history.

(56) References Cited

U.S. PATENT DOCUMENTS

| | | | | |
|---|---|---|---|---|
| 1,703,814 | A * | 2/1929 | Coutant | F23C 99/00 |
| | | | | 122/235.32 |
| 2,745,795 | A * | 5/1956 | Peniek | B01J 8/003 |
| | | | | 196/46 |
| 3,010,118 | A * | 11/1961 | Isherwood | E03C 1/264 |
| | | | | 4/688 |

(Continued)

*Primary Examiner* — Jason Lau
(74) *Attorney, Agent, or Firm* — Daniel J. Jenkins

(57) ABSTRACT

Systems and methods are disclosed that minimize erosion within a high-temperature storage bin by using particle-on-particle flow whereby flow against the wall is minimized thus protecting the walls from erosion. The flat bottom of the bin promotes a stagnant bed of particles around the outlet that provides thermal insulation and protection for the base. The systems and methods may be used for storing particles in a concentrating solar power system.

18 Claims, 8 Drawing Sheets

(56) References Cited

U.S. PATENT DOCUMENTS

| | | | | |
|---|---|---|---|---|
| 4,899,915 | A * | 2/1990 | Toepel | B01F 25/8211 |
| | | | | 222/459 |
| 6,457,425 | B1 * | 10/2002 | Crafton | F23G 5/30 |
| | | | | 110/204 |
| 6,497,545 | B1 * | 12/2002 | Simrose | A01F 25/2018 |
| | | | | 198/532 |
| 2013/0149081 | A1 * | 6/2013 | Noyes | B65G 69/0466 |
| | | | | 414/298 |
| 2015/0247670 | A1 * | 9/2015 | Robertson | F26B 17/12 |
| | | | | 34/443 |
| 2019/0056150 | A1 * | 2/2019 | Krause | C04B 35/62204 |

* cited by examiner

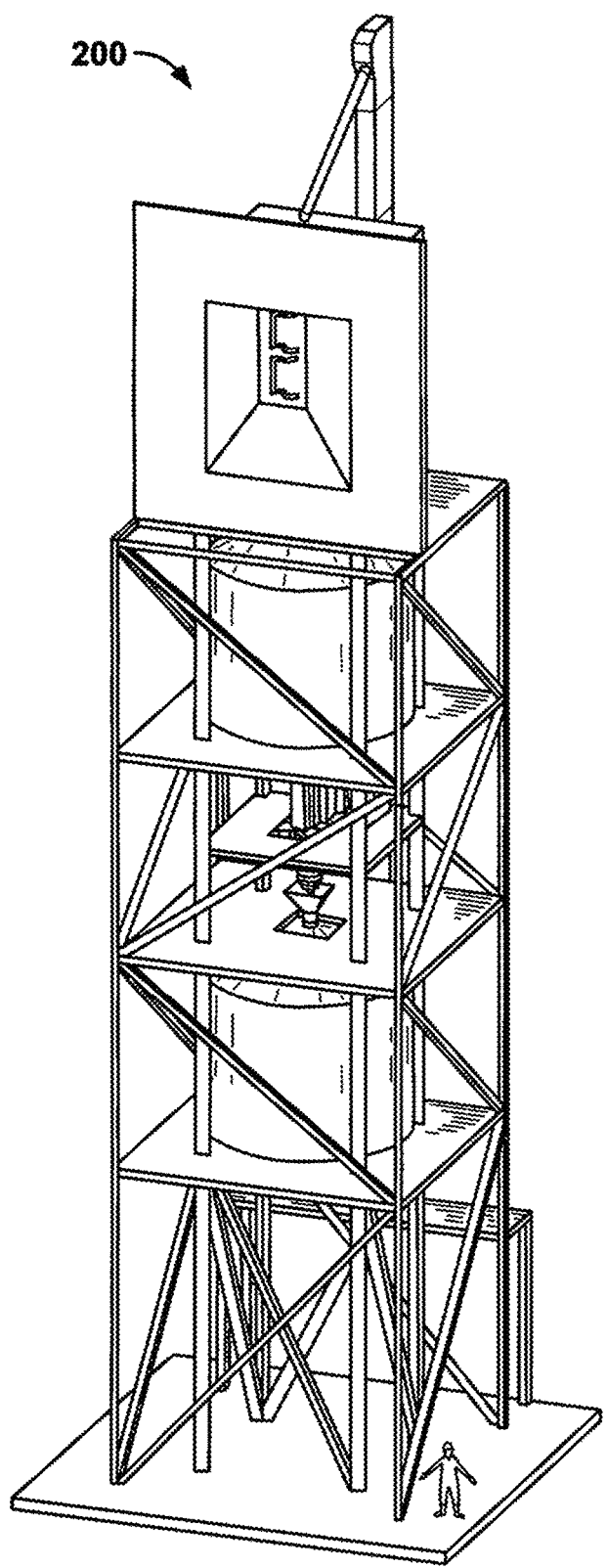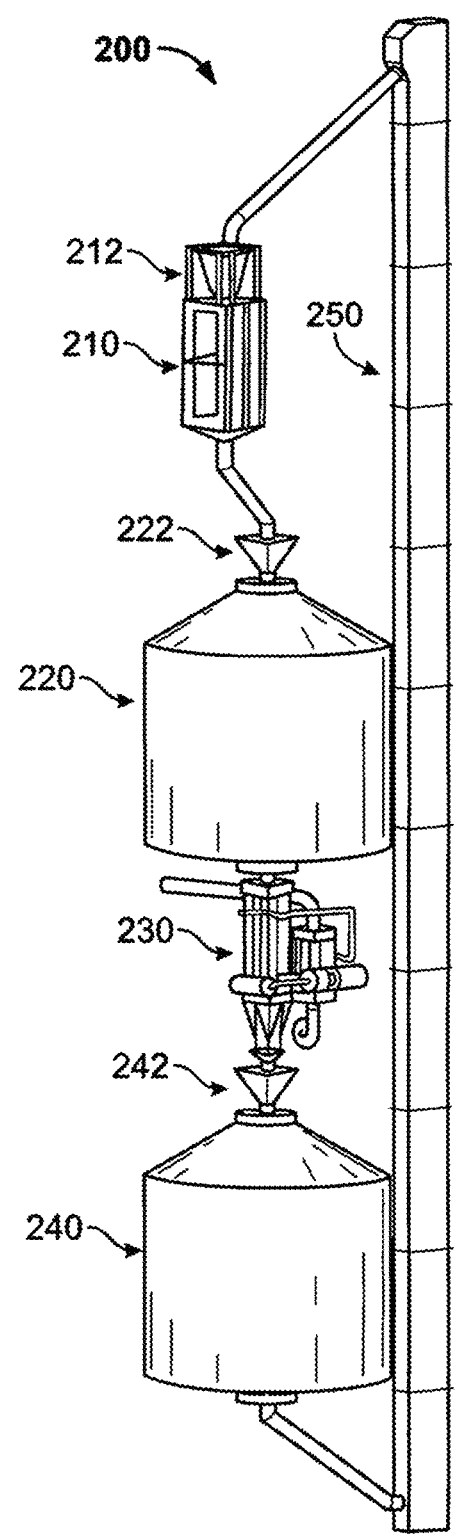
Figure 2A
Figure 2B

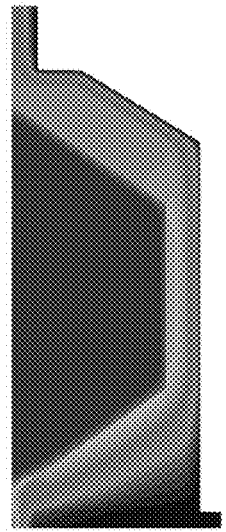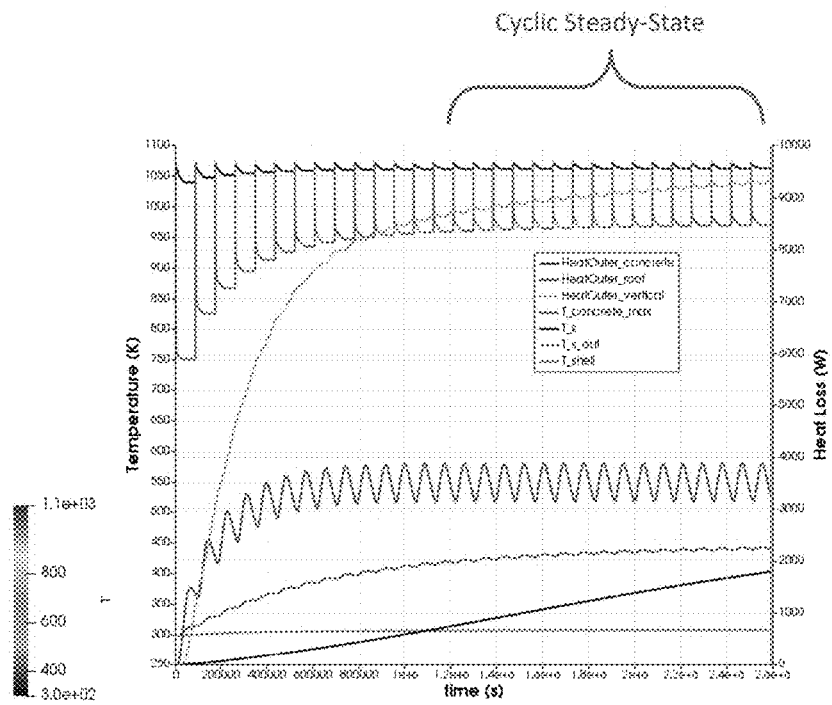
FIGURE 7A
FIGURE 7B
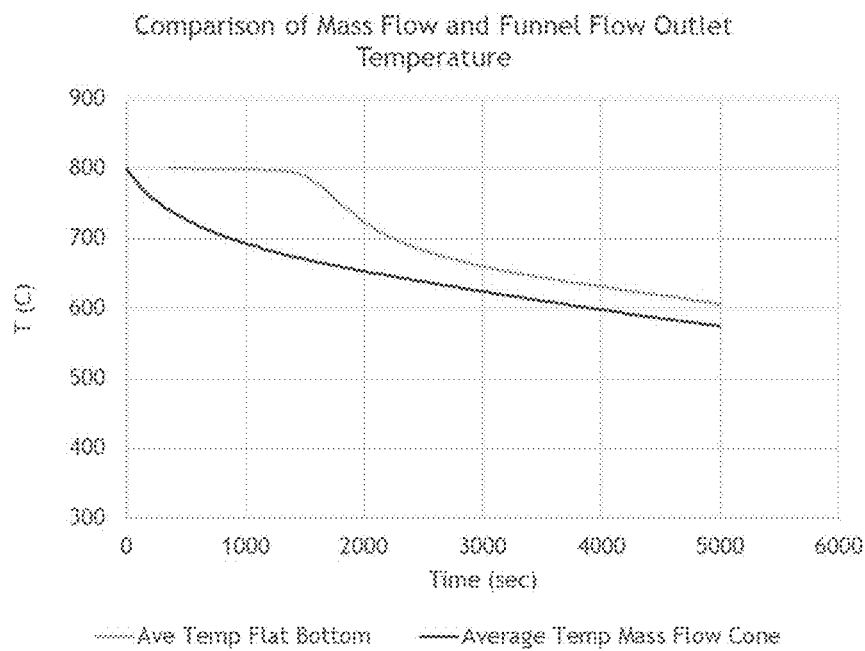
FIGURE 8

SYSTEMS AND METHODS FOR HIGH TEMPERATURE BULK SOLID STORAGE AND HANDLING

CROSS-REFERENCE TO RELATED APPLICATIONS

This application claims benefit of U.S. Provisional Patent Application No. 62/849,065, "SYSTEMS AND METHODS FOR HIGH TEMPERATURE BULK SOLID STORAGE AND HANDLING", filed May 16, 2019, which is incorporated by reference herein in its entirety.

STATEMENT OF GOVERNMENT INTEREST

The United States Government has rights in this invention pursuant to Contract No. DE-NA0003525 between the United State Department of Energy and National Technology & Engineering Solutions of Sandia, LLC, both for the operation of the Sandia National Laboratories.

FIELD

The present disclosure is generally directed to systems and methods for the storage of high-temperature bulk solids (particles), and more particularly to concentrating solar power systems (CSP) using the disclosed systems.

BACKGROUND

High-temperature particle receiver systems are being pursued by DOE and industry to achieve high-temperature, high-efficiency electricity production through direct heating of particles to ~800° C. using concentrated sunlight. For dispatchable electricity production when the sun is not shining, the particles need to be stored in large, insulated tanks. However, previous designs for particle storage have focused on granular flow of agricultural and feedstock products at ambient temperatures. New and challenging factors must be addressed when dealing with high-temperature storage of high-density, solid particles, such as the sintered bauxite ceramic particles that have been used in previous particle receiver demonstrations.

For example, flowing particles can erode refractory insulation within storage tanks that must be internally insulated for high-temperature applications. In addition, traditional tanks have steeply sloped bottoms to induce a uniform "mass flow" of bulk solids through the hopper (first in-first out). For high-temperature applications where heat loss is a concern, the additional surface-area-to-volume ratio of the steep cone is undesirable.

A need remains, therefore, for systems and methods that overcome the limitations of previous systems.

SUMMARY OF THE DISCLOSURE

The present disclosure is directed to a storage bin that includes a shell and a base that define an internal volume, the shell comprising a bin inlet and the base comprising a bin outlet. The shell comprises an outer shell and an insulative layer between the outer shell and the internal volume. The base includes an internal surface facing the internal volume that is within 20° of horizontal when the storage bin is operational.

The present disclosure is further directed to a concentrating solar power system that includes a solar receiver and a first storage bin in fluid communication with the solar receiver for receiving particles heated by solar energy in the solar receiver. The storage bin includes a shell and a base that define an internal volume. The shell includes a bin inlet and the base comprising a bin outlet. The shell also includes an outer shell and an insulative layer between the outer shell and the internal volume. The base includes an internal surface facing the internal volume that is within 20° of horizontal when the storage bin is operational.

The present disclosure is additionally further directed to a method of operating a heated particle storage system that includes heating particles, feeding the heated particles into a storage bin through an inlet, wherein the storage bin includes a shell comprising a vertical shell portion and a flat base defining an interior volume, and discharging the particles from the storage bin through an outlet in the flat base. The particles feed into and collected in the storage bin form a stagnant volume of particles upon the flat base that remain stagnant during steady state operations that discharge particles from the storage bin, the stagnant volume controlled to minimize erosion of the storage bin by using particle on particle funnel flow whereby funnel flow is away from the vertical shell portion and towards the outlet.

An advantage of the present disclosure is improved thermal-energy storage efficiency (reduced heat loss) and reduced costs of the storage tanks.

Another advantage of the present disclosure is reduced abrasion and wear on the internal walls of the storage tank via particle funnel flow (vs. mass flow).

Another advantage is reduction of wear from impingement of falling particles on the bottom of the tank.

Other features and advantages of the present disclosure will be apparent from the following more detailed description of the preferred embodiment, taken in conjunction with the accompanying drawings which illustrate, by way of example, the principles of the disclosure.

BRIEF DESCRIPTION OF THE DRAWINGS

The application will become more fully understood from the following detailed description, taken in conjunction with the accompanying figures, wherein like reference numerals refer to like elements, in which:

FIG. 2A shows an exemplary embodiment a concentrating solar power system according to an embodiment of the invention.

FIG. 2B shows a side view of the system of FIG. 2A with the shielding surrounding the receiver and the structural framing removed.

FIG. 7A shows model parameters for a cyclic thermal model for thermal contour across 2D axisymmetric cross section.

FIG. 7B shows the results for flux and heat through outer shell. Ts is the integrated average of all bulk solids. $TS_{out}$ is the integrated average temperature of the boundary layer between solid particles and the inner wall surface.

FIG. 8 shows modeled average outlet temperature of an identical mass of particles in a funnel flow and mass flow hopper.

DETAILED DESCRIPTION

Figure 1A:
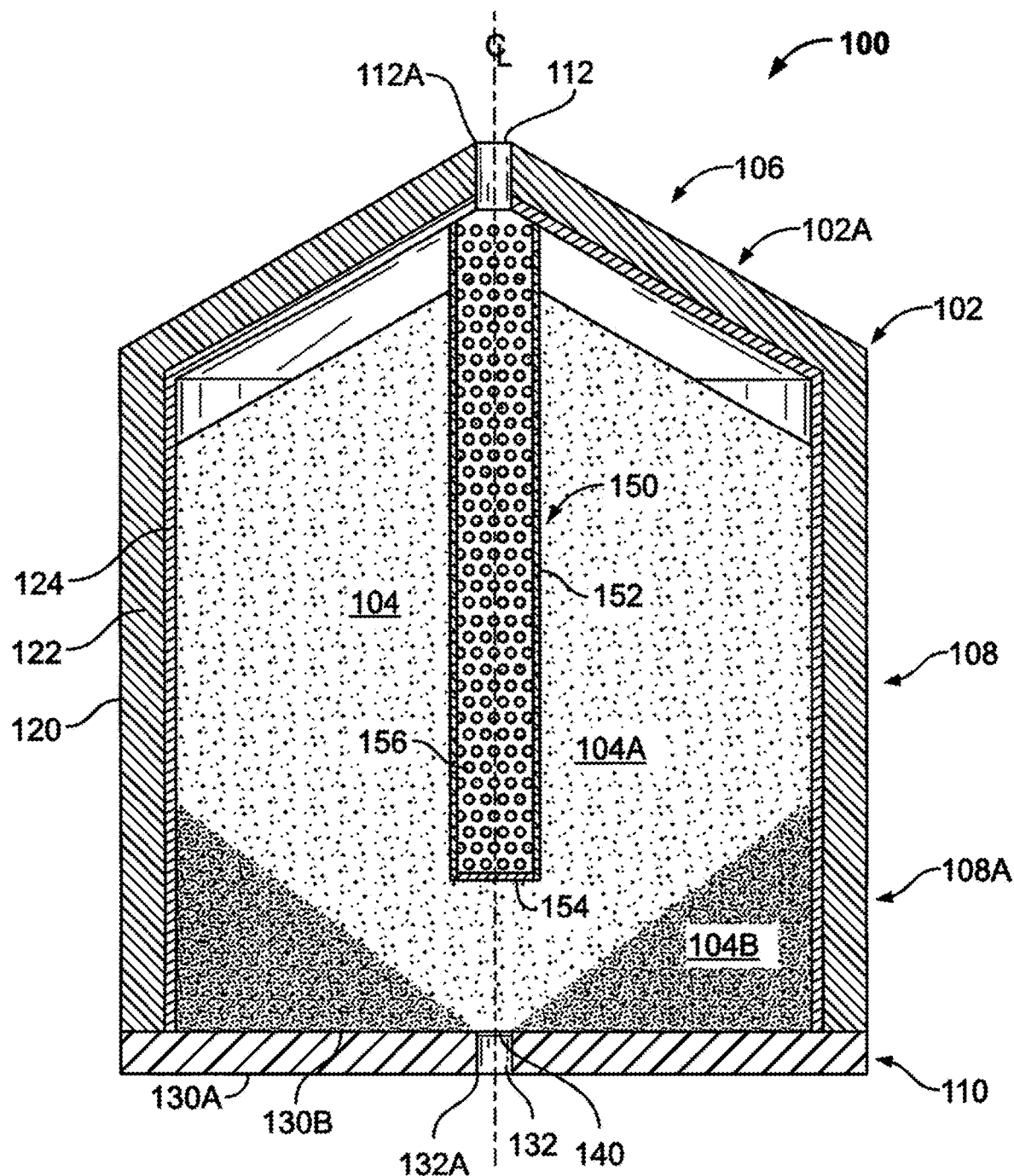
FIG. 1A is a cross-section of an embodiment of a high-temperature storage bin according to the invention.

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete and will fully convey the scope of the invention to those skilled in the art.

The present disclosure is directed to systems and methods that minimize erosion of internal surfaces of particle storage systems by using a storage bin that utilizes particle-on-particle flow and stagnant particle zones, whereby flow against the internal wall of the storage bin is minimized, thus protecting the walls from erosion. As used herein, the term particle is defined as a portion of material having a cross-section between 0.1 mm and 10 mm. In another embodiment, the particle size may be between 0.1 mm and 1.0 mm. The material of the particles may be, but is not limited to sand, ceramics, gravel, glass, ceramic beads, oxides, metals, rock, minerals, temperature-resistance refractory aggregate including, but not limited to, tabular or brown-fused alumina, calcined chamotte, calcined flint clay, or crushed firebrick grog.

The present disclosure is further directed to systems and methods that enable a stagnant bed of particles on the bottom of the bin that serve to provide additional insulation and protection from the flowing particles in the bin.

The present disclosure is further directed to high-temperature particle storage bins, vessels, hoppers, containers and the like, which will be hereafter referred to as "storage bins," that include a flat or substantially flat bottom surface or panel. As used herein, the term "substantially flat" is defined as any angle between 0° and 10° downward sloping from horizontal that is below the angle of repose of the bulk solid material that enables accumulation of particles. In such a manner, the downward pitch of the bottom towards the outlet is not to induce particle flow during steady-state operation towards the outlet, but to possibly be used by an operator, for example, to assist in cleaning out the particles from the bottom surface for maintenance.

The present disclosure is further directed to concentrating solar power (CSP) systems that utilize the disclosed storage bins of the present disclosure that improve the storage efficiency of the CSP systems.

The storage bin design enables funnel flow in the storage bin to minimize erosion on the storage bin inner walls. In conventional mass flow hoppers, the entire volume of bulk solids moves at relatively uniform velocity. In the funnel flow of the presently disclosed storage bins, the flat bottom of the storage bin and funnel flow prevents bulk solid flow at the vertical walls and permits flow only through a funnel portion in the center of the stored particle mass. As the particle level in the center drops below the particle level at the vertical walls during funnel flow, particles along the vertical walls flow in a direction away from the vertical walls along the drawdown angle into the flow channel, thus minimizing erosion caused by particle motion against the vertical walls and reducing the need for high-temperature liner surfaces such as erosion-resistant alloys.

The present disclosure is further directed to systems and methods that use a volume of particles on the bottom of a flat bottom storage bin to absorb impact and minimize direct impact with the bin containment walls. In this configuration, particles fall onto a bed of other particles present on the bottom during steady state operation and do not directly impact the bottom interior surface during steady state operation. Additionally, the particles form one or more funnel-like mound(s) along the drawdown angle, depending on the number of outlets at the bottom of the bin. Flowing particles only flow along other particles and do not flow along vertical walls or along the bottom surface of the storage bin.

Stagnant particles that do not flow out of the tank act as insulation for the bottom of the storage bin. In the flat-bottomed storage bin design, a layer of particles remains in the hopper in a pile defined by the drawdown angle. These particles have insulative properties which can eliminate the need for additional refractory insulation along the bottom of the storage bin to retain heat or to protect the bin's bottom surface from excessive temperatures. In an embodiment, the bin's bottom surface may be a concrete slab. In an embodiment, multiple outlets can be used to minimize the stagnant inventory while allowing for the insulative layers to form at ground level. In an embodiment, lower cost filler material can displace a portion of the volume of the drawdown particle formation while still allowing a topping surface of particle inventory to remain and provide the aforementioned benefits.

In an embodiment the system includes a slotted particle inlet tube to mitigate impact from high velocity particles entering the storage bin. The slotted inlet tube has a pattern of holes extending from the inlet to the bottom of the inlet to to distribute particles in a manner that prevents abrasion of both the interior surface and particles caused by high-velocity hot particles falling onto the surface of the storage bin or other particles. Initially, particles fall onto the capped bottom surface of the tube and begin to pile up and distribute into the internal space of the storage bin. As the particle pile reaches the level of the next hole pattern, particles spill out of the holes above that level and into the storage bin and slide along the mound of particles to the walls at much lower velocities than falling. As storage bin levels bury the lowest hole pattern, the particles continue to spill out of each subsequent hole pattern upward as the storage bin fills.

The present disclosure is further directed to storage bins that include specific height-to-diameter design ratios (H/D) that minimize heat loss and mechanical stresses. The thermal efficiency of the storage bin is a function of the external surface area. Surface area reduction can be achieved through optimizing the height to diameter ratio as well as using angle roofs and bases that mimic the angle of repose and drawdown angle of the particle bed. However, in bulk solids handling, wall normal force (i.e., hydrostatic pressure) is a function of the hydraulic diameter of the storage bin in addition to the height, which is fundamentally different from liquids. The optimal design for minimizing heat loss as well as structural requirements for mechanical stress at increasing capacity scales is determined.

The present disclosure is further directed to specific layers for insulation and lining that minimize ramp up time and heat loss during transient cyclic operation (unique to CSP). The efficiency of a hot particle storage tank lined with refractory heat insulation layers improves as the bulk particles transfer heat to the inner refractory layers. The material properties of the refractory layers have been identified that will provide the fastest rise to peak efficiency of cyclic operating heat losses while still sustaining hydrostatic stresses within the hopper and resisting surface erosion and abrasion from hot particle flow. In an embodiment, refractory materials that use silica and/or aluminum oxide aggregates may be used.

FIG. 1A illustrates a storage bin 100 having a generally cylindrical geometry according to an embodiment of the disclosure. In operation, the storage bin 100 has a central axis (shown) that is vertical when the storage bin 100 is operational. As can be seen in FIG. 1A, storage bin 100 is formed of a shell 102 that defines an inner space 104. The storage bin 100 includes a top portion 106, a middle portion 108 and a bottom portion 110. The top portion 106 includes a shell top portion 102a that has a generally inverted funnel or conical shape having a single inlet 112 at the apex. In other embodiments, the top portion 106 may be flat, conical or other suitable shape. In other embodiments, the top portion 106 may have one or more inlets 112.

The shell top portion 102A may be a steel or other material as discussed below regarding the shell 102. The shell top portion 102A further includes an insulative layer 122, and an inner liner 124, as discussed in more detail below. In other embodiments, the shell top portion 102A may omit the inner liner 124 and/or have a different insulative layer 122 material than the middle portion 108.

In this exemplary embodiment, the top portion 106 further includes an inlet sleeve 112A lining the inlet 112. The inlet sleeve 112 protects the inlet 112 from abrasion and/or wear as particles flow thought the inlet 112. In this exemplary embodiment, the inlet sleeve 112A is a steel. In other embodiments, the inlet sleeve 112A may be a metal, ceramic or other wear resistant material. In other embodiments, the top portion 106 may include an access or removable portion that allows for entry into the inner space 104. In an embodiment, the access may be a removable panel that surrounds the inlet 112.

In this exemplary embodiment, the middle portion 108 includes a shell middle portion 102b that is vertical when the storage bin 100 is operational. The shell middle portion 102b has an outer shell 120 and an insulative layer 122 applied to the inner surface of the outer shell 120. In this exemplary embodiment, the middle portion 108 includes an optional inner liner 124. The inner liner 124 may be a metal, metal alloy, metal mesh, or other material to protect an insulative layer 122 the particles.

In this embodiment, the outer shell 120 is formed of steel. In other embodiments, the outer shell 120 may be a metal, ceramic, or composite material. In another embodiment, the outer shell may be formed of concrete or reinforced concrete. In an embodiment, the outer shell 120 may have cooling channels. In another embodiment, the outer shell 120 may be concrete with internal cooling channels.

In this exemplary embodiment, the insulative layer 122 is a ceramic coating sprayed on the outer shell 120. The insulative layer 122 may be a shotcrete application of refractory ceramic. In other embodiments, the insulative layer 122 may include cast bricks, layered insulating panels and microporous insulation. In another embodiment, the insulative layer 122 may be precast insulative refractory panels such as calcium silicate board or microporous silica fiber board. In an embodiment, the refractory panels may have shiplap joints to allow for thermal expansion. In another embodiment, the insulative layer 122 may include a metal gasket and/or thermal paper over insulative panel seams to protect from particle penetration into the seams. In another embodiment, the insulative layer 122 may be formed of two or more layers. In yet another embodiment, the insulative layer 122 may be formed of a first layer attached to the outer shell 120 and a second layer sprayed onto the first layer. For example, the outermost layer to the shell layer may be a highly insulative microporous-fiber that provides thermal insulation but no structural support, and the second layer may be a sprayed-on high-density ceramic with high strength properties capable of resisting hydrostatic stress from the particle load. In this exemplary embodiment, the insulative layer is present in the top portion 106 and in the middle portion 108. In other embodiments, the insulative layer in the top and middle portions 106, 108 may be the same or may be different. For example, in an embodiment, the middle portion 108 may have one or more of the insulative layers as described above, and the top portion 106 may have a ceramic fiber insulation as the particles do not touch or impact the top portion during operation. In other embodiments, an optional inner liner 124 may be applied over the insulative layer 122 to protect the insulative liner 122 and/or to improve cleanability of the storage bin. The inner liner 124 may be a metal, metal alloy, metal mesh, or other material to retain the refractory from the particles.

In this exemplary embodiment, the bottom portion 110 includes a base 130. The bottom portion 110 also includes an outlet 132 located in the center of the base 130 along the central axis for discharging particles from the inner space 104. The plane of the base 130 is perpendicular to the central axis when operational, or in other words, is horizontal. The material panel has an outer surface 130A and an inner surface 130B. In this embodiment, the outer and inner surfaces 130A, 130B are parallel. In other embodiments, the inner surface 130B may be slightly downwardly sloping from the attachment point to the middle portion 108 to the outlet 132. The slightly downward slope facilitates cleaning of the inner surface 130B. As used herein, slightly downward slope is defined between greater than 0° and less than 10°. The base 130 may be referred to as a flat-bottom base. In this exemplary embodiment, the storage bin 100 includes a grate or screen 140 over the outlet 132 to retain debris, such as refractory insulation, or other unwanted material from being discharged from the storage bin 100. In other embodiments, the screen 140 may be optional. In this exemplary embodiment, the screen 140 is shown on the end of the outlet 132 at the particle entrance. In other embodiments, the screen 140 may be at the exit of the outlet 132 or disposed anywhere in between. In this exemplary embodiment, the base 130 is in direct contact with particles. In other embodiments, the liner 124 may be extended over the inner surface 130B of the base 130. In other embodiments, a liner of a different material than the material forming liner 124 may be present on the inner surface 130B.

In this exemplary embodiment, the base 130 is a concrete pad. In other embodiments, the base 130 may be formed of a refractory material, gravel, volcanic rock, or a low cost material. The base 130 must be formed of material capable of not decomposing or deforming at the operational temperatures of the storage bin. In an embodiment, the base 130 is formed of concrete capable of performing at temperatures up to 300° C. In other embodiments, the base 130 may include active and/or passive cooling features, those of which are well known in the art. For example, the base 130 may include passages for circulating a cooling fluid and external fins for dissipating heat.

As can be further seen in FIG. 1A, the storage bin 100 includes an optional feed tube 150. In options without the filler tube 150, the inlet 112 provides particles directly into the inner space 104. The feed tube 150 is disposed within the inner space 104. The receive tube receives particles from the inlet 112 and disperses, feeds or provides those particles to the inner space 104. In this exemplary embodiment, the feed tube 150 includes a casing 152 that is capped at the bottom end with an end plate 154. In other embodiments, the casing 152 is a cylindrical casing, but in other embodiments, the casing 152 may have other cross-sections, such as, but not limited to round, square and hexagonal. The feed tube 150 further includes a plurality of openings 156 that allow particles entering the feed tube to be dispersed into the inner space 104. During particle flow, particles are initially introduced into the feed tube 150 from the inlet 112 and drop through the feed tube 150 and impact the bottom plate 154 thereby preventing particles from directly impacting the inner liner 124, especially on the bottom portion/or panel 130 should the liner 124 not be present over the panel 130. As the particle level rises in the inner space 104, the openings 156 will begin to be covered with particles accumulating in the bin( ) and the particles will flow from openings higher and higher on the casing 152.

Figure 1B:
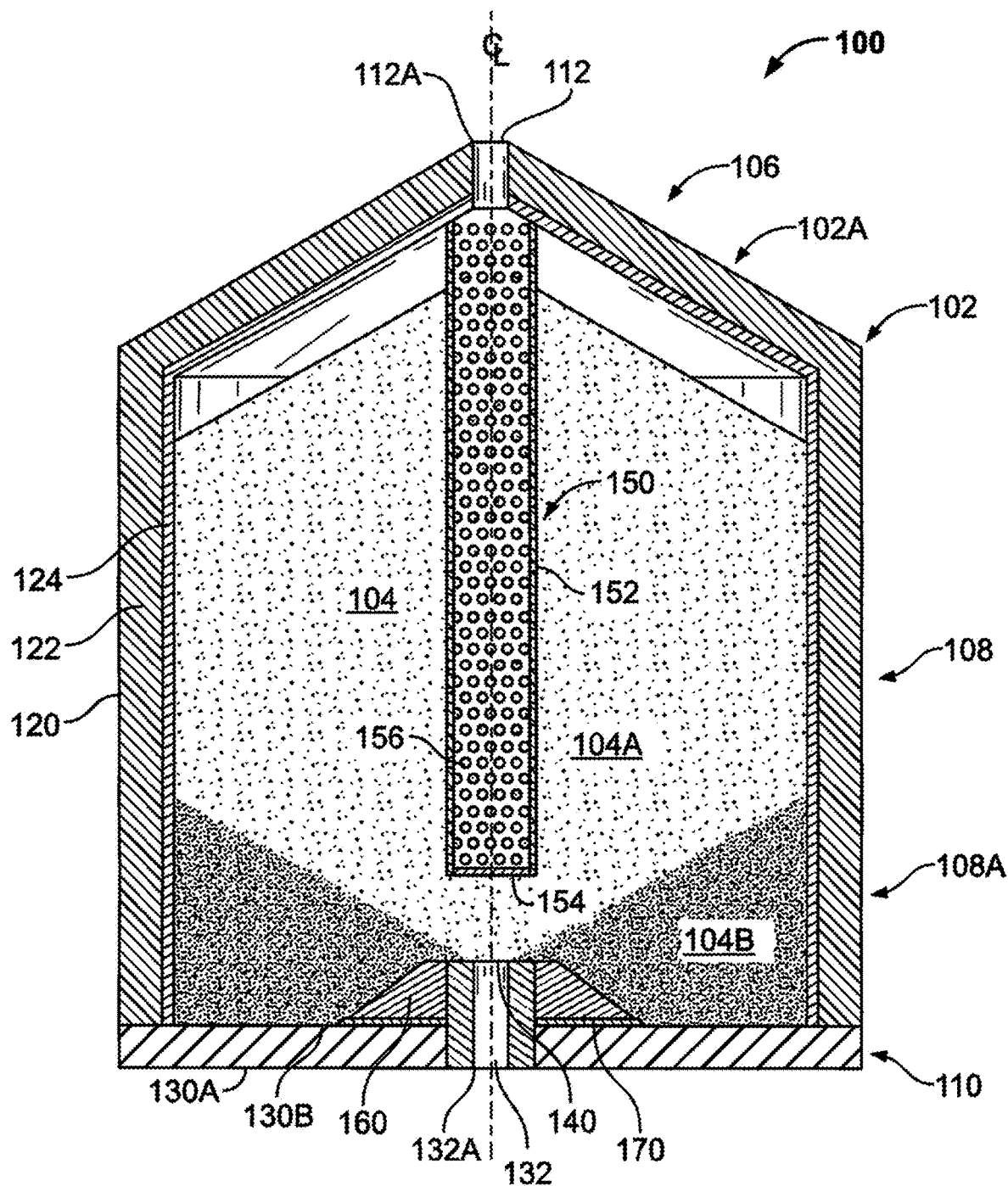
FIG. 1B is a cross-section of another embodiment of a high-temperature storage bin according to the invention.

FIG. 1B shows another embodiment of a HT storage bin 100. In this embodiment, the storage bin 100 includes a riser 160 that elevates the outlet further into the inner space 104. In such a manner, the depth of particles remaining in the bottom portion 108A of the storage bin 100 can be controlled by the height of the riser 160. In this exemplary embodiment, the riser 160 has sloped side walls facing the lower portion of the middle section 108. In another embodiment, the riser 160 may have vertical walls. In this exemplary embodiment, an insulative panel 170 is disposed between the riser 160 and the base 130. In this exemplary embodiment, the insulative panel 160 is formed of an insulating refractory ceramic such as, but not limited to, insulating castable or insulating firebrick. In other embodiments, the insulative panel 170 may be and/or include, but not limited to a force-air metallic cooling plate, microporous insulation, or refractory topping layers. In other embodiments, the slab 110 may contain active or passive cooling methods.

FIGS. 2A and 2B shows a Concentrating Solar Power (CSP) system 200 according to an embodiment of the disclosure. As can be seen in FIG. 1, the system 200 includes a falling particle solar receiver (receiver) 210, a high-temperature (HT) storage bin 220, a heat exchanger 230, a low-temperature (LT) storage bin 240, and a particle return system 250. The system 200 further includes a receiver hopper 212, a HT storage bin feed hopper 222, a LT storage bin feed hopper 242, and a particle return system 250.

The receiver 210 receives concentrated solar energy from heliostats that reflect sunlight to the receiver 210. In such a manner, solar energy heats particles passing through the receiver to temperatures up to approximately 800° C. Particles that pass through the receiver 210 are received in a HT storage bin feed hopper that provides an even flow of particles to the HT storage bin 220, embodiments thereof that are discussed above and in particular with regard to FIGS. 1A and 1B.

Particles discharged from the HT storage bin 220 are received by the heat exchanger 230 transfers heat from the particles to supercritical $CO_2$ for a Brayton power cycle. However, in other embodiments, other heat transfer materials may be used, such as, but not limited to air, water/steam, molten salt, and thermal oils. Particles discharged from the heat exchanger 230 are received by the LT storage bin feed hopper 242 that provides a buffer volume of particles for the LT storage bin 240. The LT storage bin 240 stores particles until ready to be provided to the particle return system 250. The LT storage bin 240 has the same design as the HT storage bin 220 and may include any or all of the disclosed embodiments thereof. In this exemplary embodiment, the particle return system 250 is a bucket elevator. In other embodiments, the particle return system 250 may be other material conveyance devices, such as, but not limited to skip hoists, screw elevators, drag and pan conveyors and pneumatic lifts. The particle return system 250 provides cool particles to the receiver hopper to be provided to the receiver 210, thus completing the cycle.

Additionally, the system 200 includes additional flow control devices such as, but not limited to valves, grates and the like to regulate the flow of particles within the system and between components.

Funnel flow in bulk solids occurs when the slope of the hopper bottom is not steep enough to overcome wall-friction forces and particle motion along the wall ceases and only flows through a central flow channel. Hoppers are often designed with very steep inclines in order to ensure mass flow whereby all particles in the bin have the same vertical velocity. For applications involving CSP hot particle storage, the motion of particles along the wall is a risk for erosion of the refractory insulation liner and it may be desirable to utilize funnel flow designs to prevent motion along the walls. The characteristics of funnel flow design are defined by material properties of the particles and the wall surfaces. Flow property testing was performed to derive the effective angle of internal friction ($\delta$) and kinematic angle of friction ($\phi$) at 800° C. These properties, expressed as the angle between normal and resultant forces from shear cell testing on Mohr circles, are derivatives of measured particle to particle friction forces.

The following mass flow discussion was used to determine the angle required to ensure funnel flow which is equivalent to any angle less steep than that required for mass flow.

Given the material properties of the particles and the interior substrate, maximum hopper angles for mass flow ($\theta'$) as measured from vertical can be calculated in terms of the wall friction angle ($\phi'$) and angle of internal friction ($\delta$) whose values are derived empirically from shear cell testing as $$\theta' = 90 - \frac{1}{2}\cos^{-1}\left(\frac{1-\sin(\delta)}{2\sin(\delta)}\right) - \beta \qquad \text{Equation 1}$$

where $\beta$ is the angle between the principal plane and the plane normal to the hopper wall and can be expressed as $$2\beta = \phi' + \sin^{-1}\left(\frac{\sin(\phi')}{\sin(\delta)}\right) \qquad \text{Equation 2}$$

Figure 3:
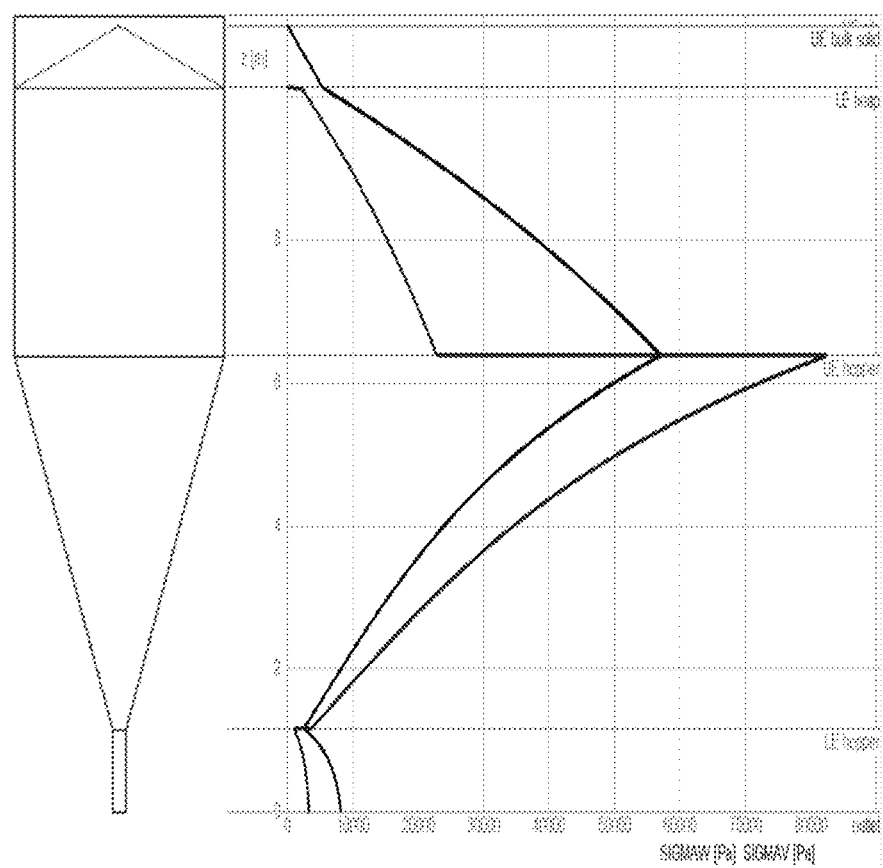
FIG. 3 is a graph of vertical (black) and horizontal (blue) stress profiles on a notional mass flow design as a function of effective head and hopper geometry.
Figure 4A:
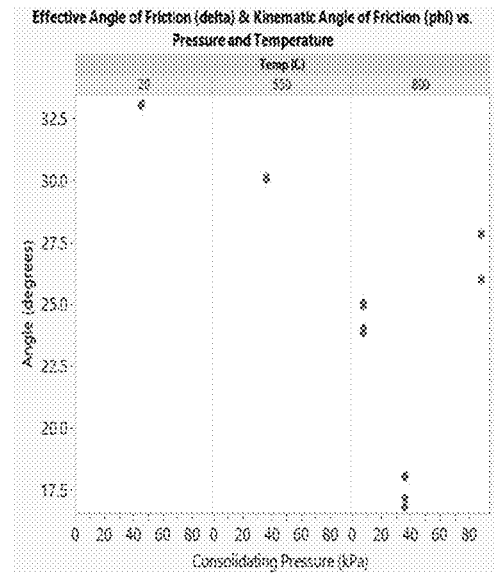
FIG. 4A shows the effective angle of internal friction ($\delta$) and kinematic angle of friction ($\phi$) as measured at multiple levels of temperature and consolidation pressure. Values at the tested temperatures are colored to indicate relevant range: blue=20° C., orange=550° C., red=800° C.
Figure 4B:
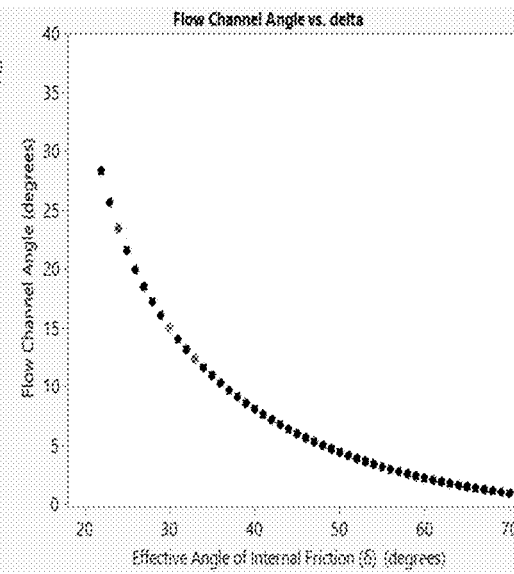
FIG. 4B shows flow channel angle as a function of & calculated using Eq. 1. Values at the tested temperatures are colored to indicate relevant range: blue=20° C., orange=550° C., red=800° C.

Mass flow hoppers exhibit a concentrated stress discontinuity at the intersection of the cylinder and the hopper section (see FIG. 3). Similarly, funnel flow hoppers experience a stress concentration where the flow channel intersects the wall of the container. In an embodiment where the flow channel angles do not contact the walls, the stress field does not exhibit a stress discontinuity (see FIG. 4A and FIG. 4B). The value of such an embodiment can be understood relative to the peak stress in a mass flow hopper. This peak horizontal stress in a mass flow hopper, or at the point where the flow channel intersects the walls in funnel flow can be estimated as $$\sigma_1 = \frac{\rho_b g D}{k_c \tan(\phi')} \quad \text{Equation 3}$$

where the values of $k_c$, the ratio of horizontal stress to vertical stress on a particle in the vertical cylinder portion of the vessel, can be assumed to be 0.4-0.6 [2] where $$k_c = \frac{1 + \sin(\delta)\cos 2\beta}{1 - \sin(\delta)\cos 2\beta} \quad \text{Equation 4}$$

At the transition, there is a discontinuity (see FIG. 4). The ratio $k_c$ the horizontal to vertical stress ratio at the transition between the parallel and slanted portions of the vessel can be expressed as $$k_c \frac{\sqrt{\tan^2(\Delta) + \cos^2(\delta)} + \sin(\delta)\tan(\Delta)}{\sqrt{\tan^2(\Delta) + \cos^2(\delta)} - \sin(\delta)\tan(\Delta)} \quad \text{Equation 5}$$

where $\Delta=\beta_v-(\beta_n+\theta)$ [4]. $\sigma_1$ at the transition can be assumed to be 3 times the parallel value just before for conical and wedge-shaped hoppers and 1.3 for expanded-flow hoppers.

In funnel flow hoppers the flow channel may expand enough to reach the container walls and form a peak stress. The location of this intersection is difficult to predict and so funnel flow containers should be designed for the same peak stress as those of mass flow. The flow channel angle ($\theta_f$) is a function of $\delta$ and describes the cone angle from a projected cylinder normal to the outlet perimeter. Peter C. Arnold gives this relationship as $$\theta_f = 45° - 0.5 \cos^{-1}\left(\frac{1-\sin(\delta)}{2\sin(\delta)}\right) \quad \text{Equation 6}$$

The remaining particles on the floor can be calculated based on these flow properties. The drawdown angle defines the slope along which the particles slide from the wall into the flow channel and consequently, the angle of the residual particles in the bottom of the container. The drawdown angle is the average of $\delta$ and $\phi$ whose values are a function of both consolidating pressure and temperature (see FIG. 4A, FIG. 4B).

Figure 5A:
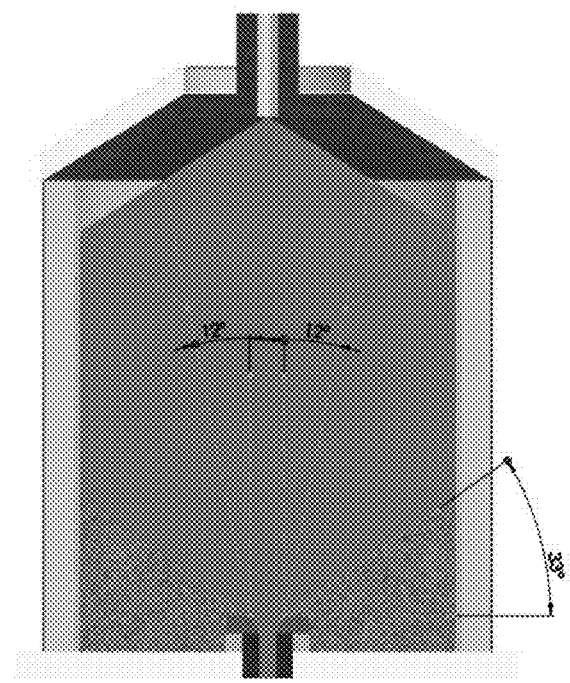
FIG. 5A shows an estimated flow channel and drawdown angle at ambient temperature.
Figure 5B:
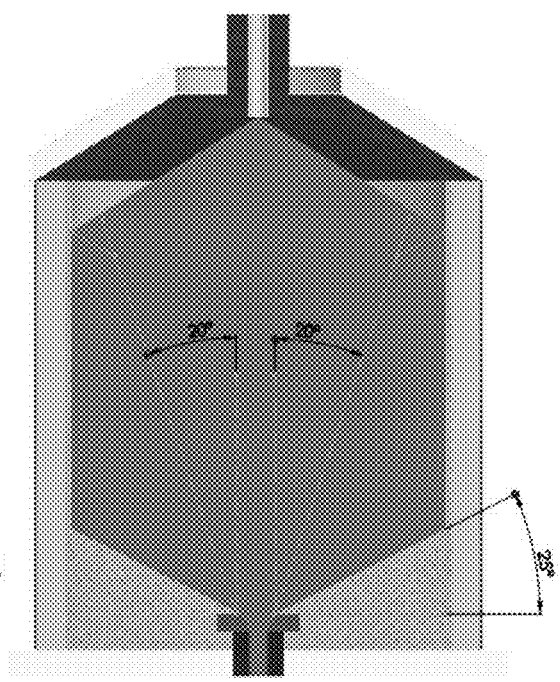
FIG. 5B shows an estimated flow channel and drawdown angle at 800° C.

The result of temperature and pressure on flow channel angles in the G3P3 storage bin is estimated to increase the flow channel angle from 12° at ambient temperature to 20° at high temperature as shown in FIGS. 5A and 5B.

Figure 6:
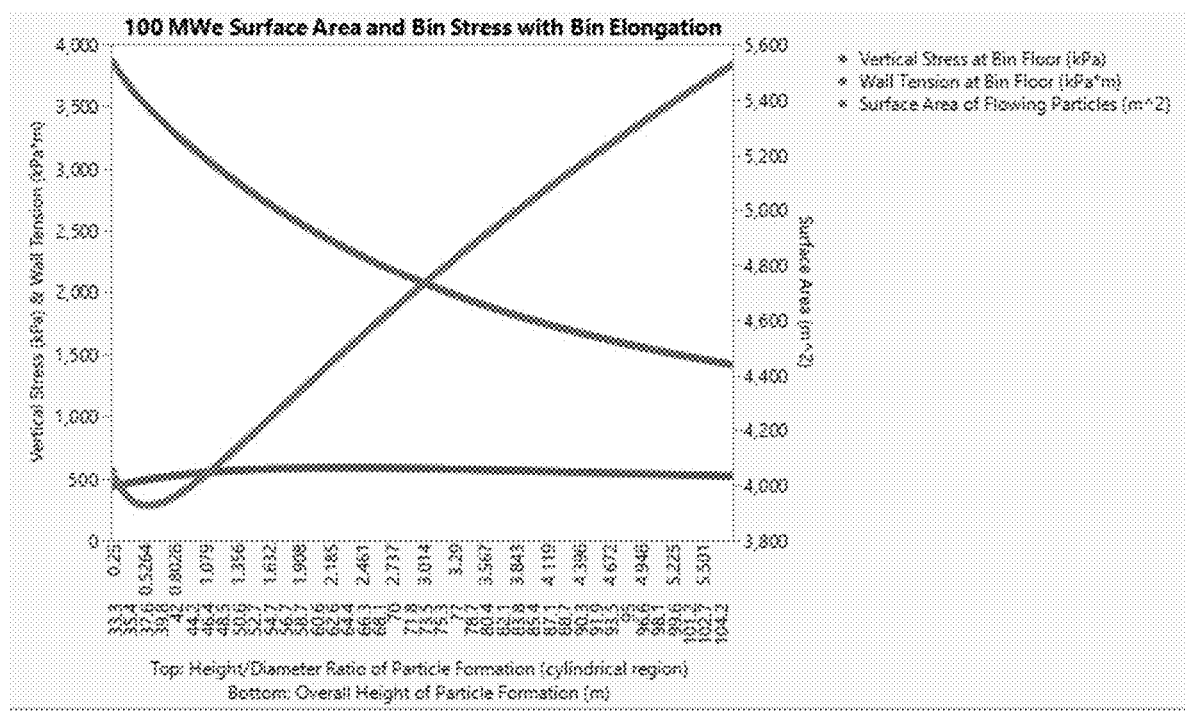
FIG. 6 shows vertical stress, wall tension, and surface area of a 100 MWe storage bin as a function of height/diameter ratio. Corresponding overall bin height is shown in lower abscissa.

There is a direct relationship between surface area of the flowing particles and heat loss. In an embodiment, the surface area of the flowing particles may be minimized. FIG. 6 calculates changes in surface area (SA) of the formation of flowing particles, maximum vertical stress on the wall at an element located at floor level, and maximum wall tension at floor level as the height to diameter (H/D) ratio of the cylinder portion of the particle formation is elongated. At each iteration, the diameter is increased thus defining the drawdown and surcharge geometries and the height is then set to maintain constant mass of the flowing portion of particles. The H/D ratio indicates the ratio of the bin diameter to the height of the cylindrical portion excluding the drawdown and surcharge heights. The resulting bin height in the bottom abscissa is of the entire particle formation including the drawdown and surcharge. The vertical stress is calculated with the Janssen equation (Eq. 4) which accounts for the supportive particle to particle friction forces that transfer some of the vertical loads to the walls of the silo thus relieving the stress acting on the bottom of the tank by an increasing amount as the bin elongates. However, as the bin diameter decreases, the area of the floor decreases by a power of 2. For this reason, the stress on the floor initially rises until an H/D ratio of about 2 where after the Janssen forces begin to dominate. Not shown is the horizontal stress which can be assumed to be about 40-60% of the vertical stress, and the shear stress which is calculated as the horizontal stress times the wall friction coefficient ($\mu_w$) where, $\mu_w=\tan(\phi')$. $\phi'$ is the wall friction angle which was measured empirically. The average value of $\mu_w$ from the top to the bottom of the bin was found to be ~0.5 at operational temperatures. The wall tension is the product of the horizontal force and the bin radius. Wall tension decreases monotonically with diameter but as bins reach heights over 50 meters seismic shear and overturning moments begin to dominate requiring a substantial amount of reinforced concrete. Dome style external storage bins are the most cost-effective solution for commercial scale storage. Receiver tower integrated storage is feasible but only in regions with minimal seismic activity.

Thermal models illustrate the self-insulating properties of the particles and predict a temperature gradient across the tank with a hot core in the center that remains nearly constant with a relatively steep drop (~300K) near the walls as shown by the lighter red contour in FIG. 7A and quantified as in FIG. 7B as the difference between T_s in and T_s out. The results shown in FIG. 6B predict a significant amount of heat will be lost to the refractory walls until enough daily charge-discharge cycles have occurred to reach a cyclic steady-state condition. The analysis also illustrates the effectiveness of the stagnant particles as an insulative layer with significantly less heat escapes through the floor (HeatOuter_concrete) than through the walls and roof (HeatOuter Vertical and HeatOuter_roof).

Figure 9:
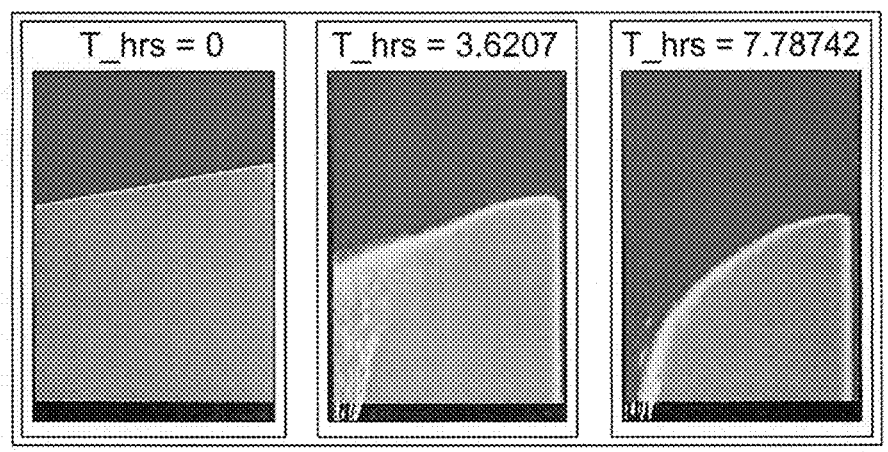
FIG. 9 are transient images from a funnel-flow model showing temperature gradients across the particles from red (hottest) to blue (coolest).

FIG. 8 shows modeled average outlet temperature of an identical mass of particles in a funnel flow and mass flow hopper. The mass flow thermal discharge profile shows the key characteristics including an initial isothermal region where the hot inner core discharges followed by a sloping region as cooler particles near the wall mix into the central flow channel (see FIG. 9).

Operations

During the initial fill of the storage bin, particles will be released into the bin and accumulate when the outlet is closed. With the optional particle feed tube, particles will not directly impact the base of the bin. Unlike severely sloped mass-flow bottom hoppers, the base of the current invention allows particles to accumulate and form a protective and insulative layer.

During steady stage operations, the particle mass flow is controlled so that the flat-bottom tank design causes a funnel-flow condition where there is zero particle motion tangent to the walls. Particles flow away from the wall along the drawdown angle and into a central flow channel whose shape is defined by the material properties of the particles at temperature (up to ~800° C.). Referring again to FIG. 1, during steady state operations, a stagnant zone of particles 104B amasses and form one or more mounds of particles at the bottom portion 110 of the storage bin 100 and covers the inner surface 130B of the bottom panel 130. These particles protect the bottom panel 130 for erosion and/or damage that would be caused by impacting particles and particle motion. It should be noted that these particles also protect a lower portion 108A of the middle portion 108 of the storage bin 100. The flowing portion of particles 104A move in a direction away from the shell middle portion 102B and downward towards the outlet 132 as described in the discussion of funnel flow above. As such, the interior surfaces of the storage bin 100 are protected from particle damage. Note that the difference in density of particles shown in FIGS. 1A and 1B are to indicate flowing (104A) versus stagnant (104B) during steady state flowing conditions. In another embodiment, the storage bin 100 may be preloaded with stagnant particles 104B. In an embodiment, the stagnant particles may be the same or different than the flowing particles 104A. For example, the storage bin 100 may be preloaded with less expensive stagnant particles. In another embodiment, the stagnant particles may be preloaded with multiple zones of stagnant particles, for example, with less expensive particles next to the bottom panel 130 and flowing particles on top of the less expensive particles to shield the less expensive particles from mixing with the flowing particles during operation. In an embodiment, the less expensive particles may be, but are not limited to sand, gravel, basalt, lava rock, expanded perlite, fused silica, non-crystalline glass, or cenospheres.

During particle storage operations, no particles flow out of the storage bin, but are stored to be released at a time when heat can be extracted at the heat exchanger as stored energy in the particles is needed.

The particles have self-insulating properties that are exploited as part of the overall tank design. The result is a temperature gradient across the tank with a hot core in the center and cooler regions near the walls. A significant amount of heat will be lost to the refractory walls until enough daily charge-discharge cycles have occurred to reach a cyclic steady-state condition (see FIG. 6B).

The invention being thus described, it will be obvious that the same may be varied in many ways. Such variations are not to be regarded as a departure from the spirit and scope of the invention, and all such modifications as would be obvious to one skilled in the art are intended to be included within the scope of the appended claims. It is intended that the scope of the invention be defined by the claims appended hereto. The entire disclosures of all references, applications, patents and publications cited above are hereby incorporated by reference.

In addition, many modifications may be made to adapt a particular situation or material to the teachings of the disclosure without departing from the essential scope thereof. Therefore, it is intended that the disclosure not be limited to the particular embodiment disclosed as the best mode contemplated for carrying out this disclosure, but that the disclosure will include all embodiments falling within the scope of the appended claims.

What is claimed is:

1. A storage bin for particles heated by a concentrating solar power receiver, comprising:
    a shell and a base that define an internal volume, the shell comprising a bin inlet and the base comprising a bin outlet;
    wherein the shell comprises an outer shell and an insulative layer between the outer shell and the internal volume; and
    wherein the base includes an internal surface facing the internal volume that is within 10° of horizontal when the storage bin is operational; and
    wherein the bin inlet is connected to a particle feed that provides particles heated by the concentrating solar power receiver to the internal volume; and
    wherein the internal volume is accessible only by the bin inlet and the bin outlet; wherein the storage bin further comprises:
    a feed tube extending from the inlet into the internal volume, wherein the feed tube comprises an end cap opposite the inlet that prevents particles falling through the feed tube from directly impacting the base; and
    wherein the feed tube further comprises a plurality of openings that distribute particles from within the feed to the internal volume.

2. The storage bin of claim 1, further comprising a riser upon the base, the riser supporting the outlet to a riser height into the interior volume above the internal surface of the base.

3. The storage bin of claim 1, further comprising:
    a liner between the insulative layer and the internal volume.

4. The storage bin of claim 1, wherein the insulative layer comprises a sprayed ceramic layer.

5. The storage bin of claim 1, wherein the base is formed of concrete.

6. The storage bin of claim 1, wherein the base comprises active or passive cooling.

7. A concentrating solar power system, comprising:
    a solar receiver; and
    a first storage bin in fluid communication with the solar receiver for receiving particles heated by solar energy in the solar receiver;
    wherein the first storage bin comprises:
    a shell and a base that define a continuous internal volume, the shell comprising a bin inlet and the base comprising a bin outlet;
    wherein the shell comprises an outer shell and an insulative layer between the outer shell and the internal volume;
    wherein the base includes an internal surface facing the internal volume that is within 10° of horizontal when the storage bin is operational; and
    wherein the first storage bin further comprises:
    a feed tube extending from the inlet into the continuous internal volume;
    wherein the feed tube further comprises a plurality of openings that distribute particles from within the feed to the continuous internal volume.

8. The concentrating solar power system of claim 7, wherein the feed tube comprises an end cap opposite the inlet that prevents particles falling through the feed tube from directly impacting the base.

9. The concentrating solar power system of claim 7, further comprising a riser upon the base, the riser supporting the outlet to a riser height into the continuous interior volume above the internal surface of the base.

10. The concentrating solar power system of claim 7, further comprising:
   a liner between the insulative layer and the continuous internal volume.

11. The concentrating solar power system of claim 7, wherein the insulative layer comprises a sprayed ceramic layer.

12. The concentrating solar power system of claim 7, wherein the base is formed of concrete.

13. The concentrating solar power system of claim 7, wherein the base comprises active or passive cooling.

14. The concentrating solar power system of claim 7, further comprising:
   a heat exchanger in fluid communication with the first storage bin.

15. The concentrating solar power system of claim 14, further comprising:
   a second storage bin in fluid communication with the heat exchanger, the second storage bin comprising:
   a shell and a base that define an internal volume, the shell comprising a bin inlet and the base comprising a bin outlet;
   wherein the shell comprises an outer shell and an insulative layer between the outer shell and the internal volume; and
   wherein the base includes an internal surface facing the internal volume that is within 10° of horizontal when the storage bin is operational.

16. A method of operating a heated particle storage system, comprising: heating particles;
   feeding the heated particles into a storage bin through an inlet, the storage bin comprising a shell comprising a vertical shell portion and a base defining an interior volume; and
discharging the particles from the storage bin through an outlet in the base;
   wherein the particles feed into and collected in the storage bin form a stagnant volume of particles upon the base that remain stagnant during steady state operations that discharge particles from the storage bin, the stagnant volume controlled to minimize erosion of the storage bin by using particle on particle funnel flow whereby funnel flow is away from the vertical shell portion and towards the outlet; and
   wherein the particles fed into the storage bin are distributed into the interior volume by a feed tube that penetrates into the internal volume, the feed tube comprising an end cap that prevents the fed particles from directly impacting the flat base.

17. The method of claim 16, wherein the particles fed into the storage bin are distributed into the interior volume by a feed tube that penetrates into the internal volume, the feed tube comprising an end cap that prevents the fed particles from directly impacting the flat base.

18. The method of claim 16, wherein a riser surrounding the outlet and attached to the flat base and having a height into the interior volume retains a portion of the stagnant particles in the internal volume.

* * * * *